Nov. 3 1925.  
P. J. SEFERLIS  
1,560,350  
LIQUID LEVEL INDICATOR  
Filed April 3, 1923

Inventor  
Peter J. Seferlis

By F. K. Bryant  
Attorney.

Patented Nov. 3, 1925.

1,560,350

UNITED STATES PATENT OFFICE.

PETER J. SEFERLIS, OF ITHACA, NEW YORK.

LIQUID-LEVEL INDICATOR.

Application filed April 3, 1923. Serial No. 629,667.

*To all whom it may concern:*

Be it known that I, PETER J. SEFERLIS, a citizen of the United States of America, residing at Ithaca, in the county of Tompkins and State of New York, have invented certain new and useful Improvements in Liquid-Level Indicators, of which the following is a specification.

This invention relates to certain new and useful improvements in depth gages and has for its primary object to provide a gage capable of being mounted upon the instrument board of an automobile for association with a gasoline supply tank, a sump or crank case or a radiator to indicate the depth of liquid therein, it being noted, however, that the inveniton may be well adapted for indicating the depth of liquids in various other instances.

Another object of the invention resides in the provision of a depth gage wherein a casing provided with separate communicating chambers has air pressure means associated with one chamber and a depth gage associated with the other chamber a quantity of liquid contained in the separate chambers being forced by air pressure in one chamber into the other chamber for operating the depth indicating means.

Another and important object of the invention is to provide a manually operable pump device associated with the casing and chambers for removing and renewing air contained in the separate chambers for restoring normal pressure in the chambers for the correct working of the indicator.

This application is filed as a continuation in part of the construction of device shown and claimed in application filed by Peter J. Seferlis for improvements in depth gages on August 2, 1922, Serial No. 579,-152, and embodies improvements in the art thereover.

With the above general objects in view and others that will appear as the nature of the invention is better understood, the same consists of the novel form, combination and arranged of parts hereinafter more fully described shown in the accompanying drawing and claimed.

Figure 1:
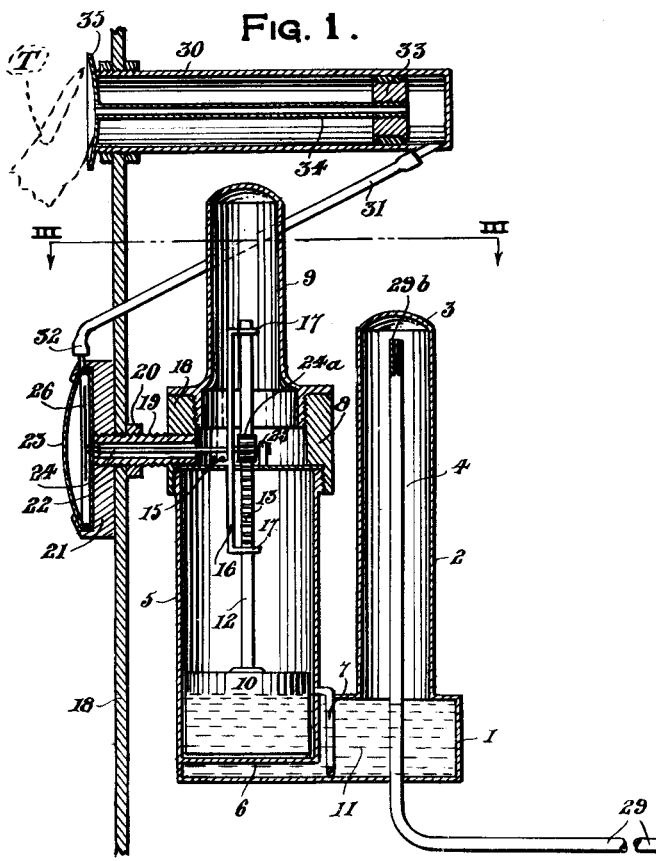
Figure 2:
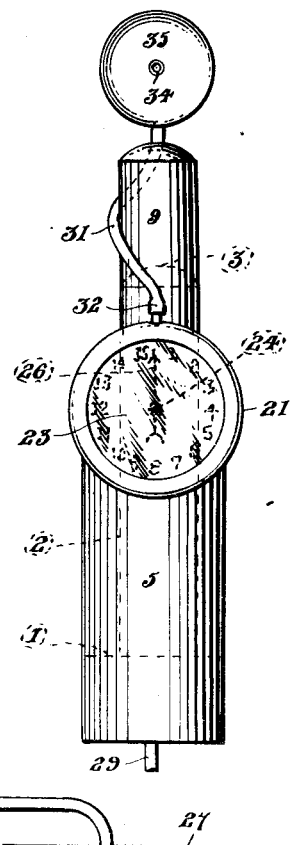
Figure 3:
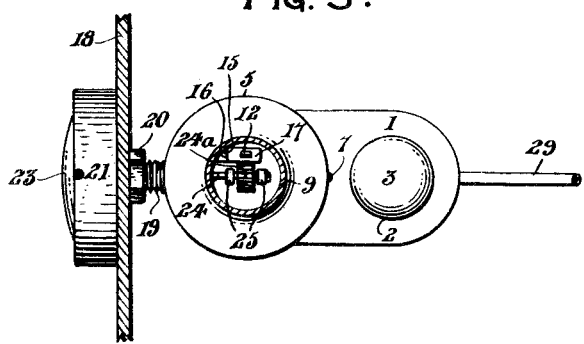
Figure 3:
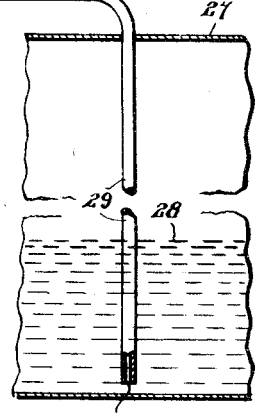

In the drawing, wherein like reference characters designate corresponding parts throughout the several views, Figure 1 is a vertical sectional view of a liquid depth gage constructed in accordance with the present invention, the same being illustrated as mounted upon the instrument board of an automobile and showing the separate communicating chambers carried by the casing, the tube extending from a liquid receptacle to one of the chambers, the liquid in the casing to be displaced by air pressure and the indicator in one of the chambers with the manually operable pump device for renewing air in the gage, Figure 2 is a front elevational view of the depth gage detached from the instrument board, and Figure 3 is a horizontal sectional view taken on line III—III of Fig. 1.

In gages of the character hereinafter described, wherein air pressure confined within a casing or chamber is adapted for shifting or displacing a body of liquid to effect operation of an indicator, it has been found that the air confined under pressure will expand or contract by a change in its temperature and cause the improper displacement of liquid in the gage with the result that the depth indicator inaccurately registers the depth of liquid in a receptacle. It is therefore one of the important objects of this invention to displace or renew the air in the gage and conduit associated therewith, a manually operable pump associated with the gage, being employed for this purpose to provide a new body of air within the gage casing and chambers that is unaffected by abnormal heat which renders the gage highly accurate for the purpose intended.

In the accompanying drawing which shows a preferred embodiment of the invention, there is illustrated a depth gage embodying a casing 1 of a configuration shown more clearly in Figs. 1 and 3 that supports adjacent one end thereof a vertical stand pipe 2 closed at its upper end as at 3 to provide an air chamber 4 with the lower end of the pipe 2 in unrestricted communication with the lower casing 1. A gage chamber 5 projects perpendicularly from the other end of the casing 1, the same being closed at its lower end as at 6 and extending downwardly into the casing, communication between the casing 1 and indicator chamber 5 being established by a pipe section 7 of angle formation as shown in Fig. 1 that extends from a point adjacent the bottom wall of the casing to the chamber 5 at a point adjacent the upper wall of the casing and above the bottom wall of the chamber. The upper end of the chamber 5 is externally threaded for the reception of the collar 8 that in turn is internally threaded at its upper end to receive the depending threaded flange of the closed cap 9.

The gage includes a float 10 freely mounted in the chamber 5 to be raised and lowered by the rise and fall of the liquid 11 in the casing 1 and lower end of the chamber 5, the float 10 carrying a rod 12 having rack teeth 13 formed on a portion of the length thereof. A cross brace 14 traversing the upper end of the chamber 5 and retained in position by the collar 8 has anchored thereto, the arm 15 of the guide bracket 16, the upper and lower ends of the bracket being angularly bent as at 17 and provided with guide openings for the passage of the float rod 12.

In the use of the device as disclosed herein, the gage is mounted upon the instrument board 18 of an automobile through the medium of a relatively short pipe section 19, one end of which is threaded into one side of the collar 8 while the other end thereof is threaded through the instrument board 18 and clamped in position by the jamb nut 20. An indicator casing is supported upon the front face of the instrument board 18 and includes a base plate 21 into which the adjacent end of the pipe section 19 is threaded, a dial plate 22 being secured to the base plate 21 and covered by the glass plate 23. An indicator shaft 24 extends through the pipe section 19 and is journaled at its inner end in the upper end of the chamber 5 in bearings 25 supported on the cross brace 14, the outer end of the shaft 24 being journaled through the dial plate 22 and carrying an indicator arm 26 upon the outer end thereof as shown in Fig. 1, a pinion 24ª on the shaft engaging the rack teeth 13.

A main supply tank 27 containing liquid 28 has a tube conduit 29 extending from a point adjacent the lower end thereof as at 29ª to the casing 1 and projects upwardly therethrough and into the chamber 4 of the stand pipe 2 and terminates as at 29ᵇ adjacent the upper end of the chamber 4.

For the purpose of displacing and renewing air in the gage chamber 4 and the conduit 29, a pump cylinder 30 is supported upon the instrument board 18 and has a pipe connection 31 with one side of the pipe section 19 as at 32 by attachment to the indicator at the front side of the instrument board. A piston 33 having an axial bore carries a tubular piston rod 34 that projects through the forward open end of the cylinder 30 and has attached thereto a concaved disk 35 with the open outer end of the piston rod communicating with the atmosphere.

With the parts in the position shown in Fig. 1, the pump 30 has been operated to force air through the chambers 5 and 4, and pressure pipe 29 to displace the liquid 28 from the lower end of said pipe for the purpose of replenishing air at normal temperature therein. During operation of the pump, the liquid is forced from the chamber 5 through the pipe 7 into the lower end of the air chamber 4 or casing 1, the liquid in chamber 5 being lowered only to a predetermined level, coincident with the upper end of pipe 7 that enters said chamber with sufficient liquid remaining in chamber 5 to suspend the float 10 and to space the lower end of the float from the bottom wall 6 of the chamber. By so positioning the pipe 7, the float 10 is prevented from contacting the bottom wall of the chamber 5 and prevents any tendency of the float to bind upon the walls of the chamber and thereby insures perfect operation of the float. When the thumb T is removed from the disk 35, the pump is rendered inoperative to permit the fluid 28 in the supply tank 27 to rise in the conduit 29 to force air into the chamber 4 for contact with the liquid 11, displacing the liquid by its pressure through the pipe 7 and into the chamber 5 with a consequent rise of the float 10 and with the rack teeth 13 engaging the pinion 24ª, the shaft 24 is rotated for moving the indicator arm 26 over the dial plate 22, the arm 26 indicating the exact depth of liquid in the receptacle 27. The depth gage being positioned upon the instrument board 18 in proximity of the internal combustion engine of the automobile, the same is quite frequently affected by heat which causes an expansion of air within the chamber 4 tending to give an inaccurate reading on the dial of the fluid depth, but by operating the pump in the manner as above described by closing the open outer end of the pump rod 34 by the thumb T, the air in the chamber 4 is changed or renewed, as well as in the conduit 29 to provide for an accurate reading on the indicator. When the liquid in the tank 27 is lowered by consumption thereof air pressure in the chamber 4 is reduced permitting the liquid in the chamber 5 to flow through the pipe 7 and into the casing 1 with a consequent lowering movement of the float 10 with a change in reading on the dial, the liquid in chamber 5 descending only to the predetermined level coincident with the upper end of the pipe 7.

While there is herein shown and described the preferred embodiment of the present invention, it is nevertheless to be understood that minor changes may be made therein without departing from the spirit and scope of the invention as claimed.

What is claimed as new is:—

1. Means for indicating liquid depth, wherein air pressure displacing a liquid causes movement of an indicator arm, comprising a casing having separate chambers containing a low level of liquid, a pipe connected to one chamber at a point above the bottom wall thereof and extending into the other chamber and terminating adjacent the bottom wall of said other chamber whereby the liquid in the first named chamber descends only to a predetermined level, a float in the first named chamber, an indicator arm, operative connections between the float and indicator arm, and a pressure pipe having one end submerged in the liquid to be measured with the other end extending into the other chamber and terminating adjacent the upper end thereof above the liquid therein.

2. Means for indicating liquid depth, wherein air pressure displacing a liquid causes movement of an indicator arm, comprising a casing having separate chambers containing a low level of liquid, a pipe connected to one chamber at a point above the bottom wall thereof and extending into the other chamber and terminating adjacent the bottom wall of said other chamber whereby the liquid in the first named chamber descends only to a predetermined level, a float in the first named chamber, an indicator arm, operative connections between the float and indicator arm, a pressure pipe having one end submerged in the liquid to be measured with the other end extending into the other chamber and terminating adjacent the upper end thereof above the liquid therein, and means for replenishing air in the chambers and pipe including a pump attached to the first named chamber for moving an amount of liquid therein equal to the amount of liquid above the low level in the first named chamber into the other chamber to permit movement of air through the chambers and pressure pipe.

3. Means for indicating liquid depth, wherein air pressure displacing a liquid causes movement of an indicator arm, comprising a casing having separate chambers containing a low level of liquid, a pipe connected to one chamber at a point above the bottom wall thereof and extending into the other chamber and terminating adjacent the bottom wall of said other chamber whereby the liquid in the first named chamber descends only to a predetermined level, a float in the first named chamber, an indicator arm, operative connections between the float and indicator arm, a pressure pipe having one end submerged in the liquid to be measured with the other end extending into the other chamber and terminating adjacent the upper end thereof above the liquid therein, a casing for the indicator arm, means forming communication between the indicator casing and the chamber containing the float, and means for replenishing air in the chambers and pipe including a pump attached to the indicator casing for moving an amount of liquid therein equal to the amount of liquid above the low level in the first named chamber into the other chamber to permit movement of air through the chambers and pressure pipe.

4. Means for indicating liquid depth, wherein air pressure displacing a liquid causes movement of an indicator arm, comprising a casing having separate chambers containiing a low level of liquid, a float in one chamber, an indicator arm, operative connections between the float and arm, means forming communication between the two chambers, a pressure pipe having one end submerged in the liquid to be measured with the other end extending into the other chamber and means for replenishing air in the chambers and pipe causing a portion of the liquid in the float contained chamber to descend to a low level and flow into the other chamber, the communicating means between the two chambers being so arranged to insure sufficient liquid remaining in the float contained chamber to cause the float to be suspended and spaced from the bottom wall of the chamber when the liquid reaches the low level.

In testimony whereof I affix my signature.

PETER J. SEFERLIS.